J. CORBEIL.
POTATO BUG CLEANER.
No. 80,458.
Patented July 28, 1868.
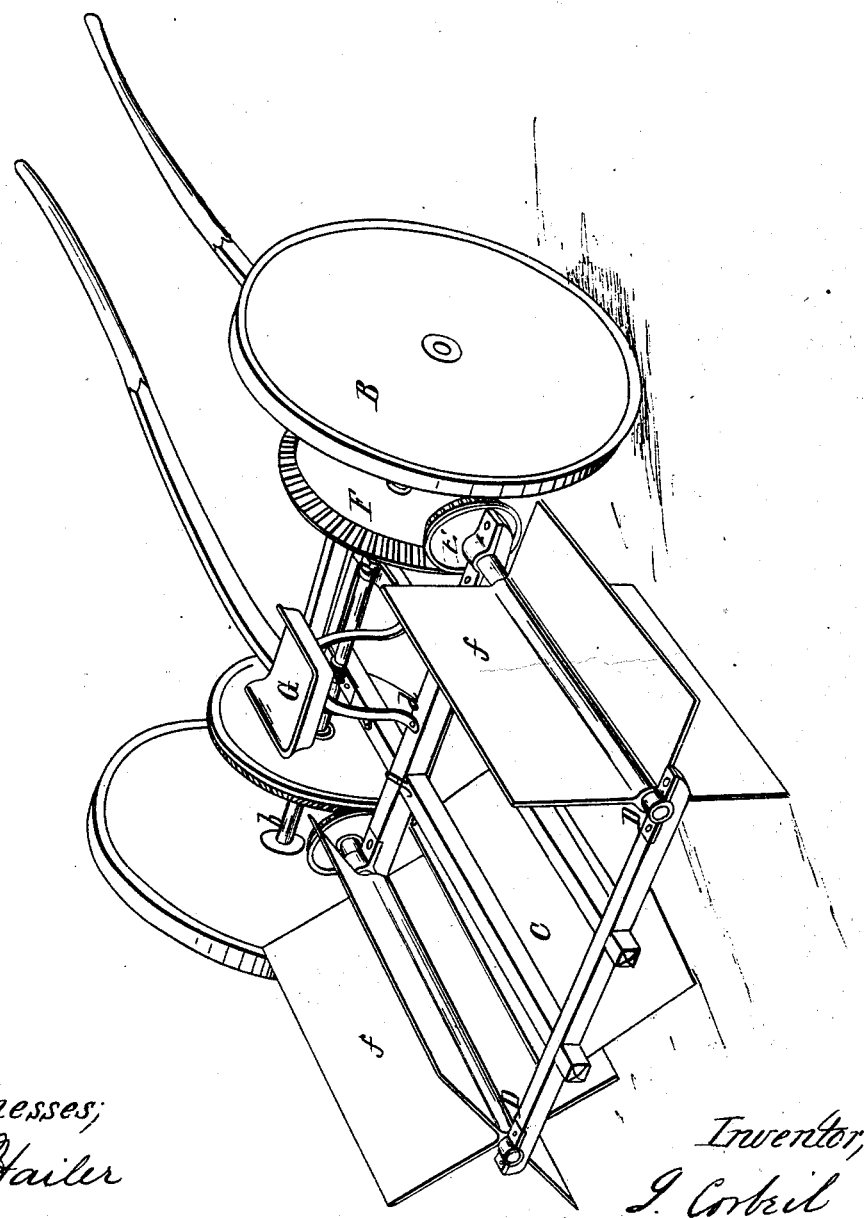
Witnesses:
L. Hailer
P. T. Dodge
Inventor:
J. Corbeil
By Dodge & Munn
his attys

United States Patent Office.

JOSEPH CORBEIL, OF LIND, WISCONSIN.

Letters Patent No. 80,458, dated July 28, 1868.

IMPROVEMENT IN POTATO-BUG CLEANER.

*The Schedule referred to in these Letters Patent and making part of the same.*

TO ALL WHOM IT MAY CONCERN:

Be it known that I, JOSEPH CORBEIL, of Lind, in the county of Waupaca, and State of Wisconsin, have invented certain new and useful Improvements in Machines for Cleaning the Bugs from Potato-Vines; and I do hereby declare that the following is a full, clear, and exact description thereof, reference being had to the accompanying drawings, making part of this specification, and to the letters of reference marked thereon, like letters indicating like parts wherever they occur. To enable others skilled in the art to construct and use my invention, I will proceed to describe it.

My invention relates to machines for cleaning bugs from potato-vines, and for similar purposes, and consists of a novel device, constructed and arranged for operation in the open field, by means of horse or other suitable power, for gathering the bugs.

In the drawings—

Figure 1 is a perspective view of my machine, showing clearly all its parts.

In many sections of the country the insects popularly known as "potato-bugs" have become so numerous as to render it difficult to raise a crop of potatoes with any certainty. These bugs feed upon the vines or stalks of the growing potatoes, and, if they do not destroy, greatly injure them.

The object of my invention is to provide a machine that may be used to abate this nuisance.

I construct a suitable frame, A, and connect it, by means of the bearings $a$, to the axle $b$, to which are rigidly attached, at each extremity, the wheels B, as shown in the drawing. As the wheels B revolve, the axle $b$ turns loosely in the bearings $a$ of the frame A. On the under side of the frame A, I place, longitudinally, a V-shaped receptacle, C, and on each side, and parallel with it, I mount the fan-shaped wheels D, with their axles $c$ resting in bearings $e$, in the frame A. The axles $c$ I extend far enough in front of the cross-bar $d$ to have rigidly attached to them pinions E, which gear into the cog-wheels F, which are rigidly attached to the axle $b$, and arranged so as to cause the wheels D to revolve in opposite directions.

The wheels D, I provide with four or more fans, as shown in the drawing, and which, in revolving, freely pass by the upper edge of the receptacle C.

To the axle $b$, I attach the thills F, in any convenient manner, when it is desired to employ a horse for operating the machine in large fields.

Immediately over the axle $b$ and the forward end of the frame A, I mount a seat, G, for the driver.

In operating my machine, I drive it through the fields when the bugs are numerous and at work. The wheels B are wide enough apart to run in the furrows, just outside of two parallel rows of potatoes, and the wheels D are arranged to revolve over the rows, and the V-shaped receptacle C to be over the furrow between the rows. As the machine is drawn forward, the wheels B, as they revolve, cause, through the cog-wheels F and pinions E, the wheels D to revolve very rapidly, and as they revolve, their wings or fans $f$ strike against the potato-vines, knock the bugs loose, and with their motion, as well as by the current of air created by their motion, the bugs are swept swiftly into the receptacle C, and there left. When a sufficient number of them have been gathered in this way for the purpose, they can be destroyed by any means convenient for the purpose.

By means of my machine, thus simply constructed and operated, I am able in a short time to gather and remove the larger portion of the bugs feeding upon and destroying the potato-vines from the field.

Having thus described my invention, what I claim, is—

The machine for cleaning vines or vegetables of bugs or insects, consisting of a suitable frame mounted on wheels, and having the central receptacle C, and the two side revolving fans or beaters D, all constructed and arranged to operate substantially as described.

JOSEPH CORBEIL.

Witnesses:
PETER MEIKBJOHN,
G. M. A. BROWN.